April 19, 1955  F. M. POTGIETER  2,706,388
SLIP CLUTCH ASSEMBLY
Filed Sept. 17, 1952
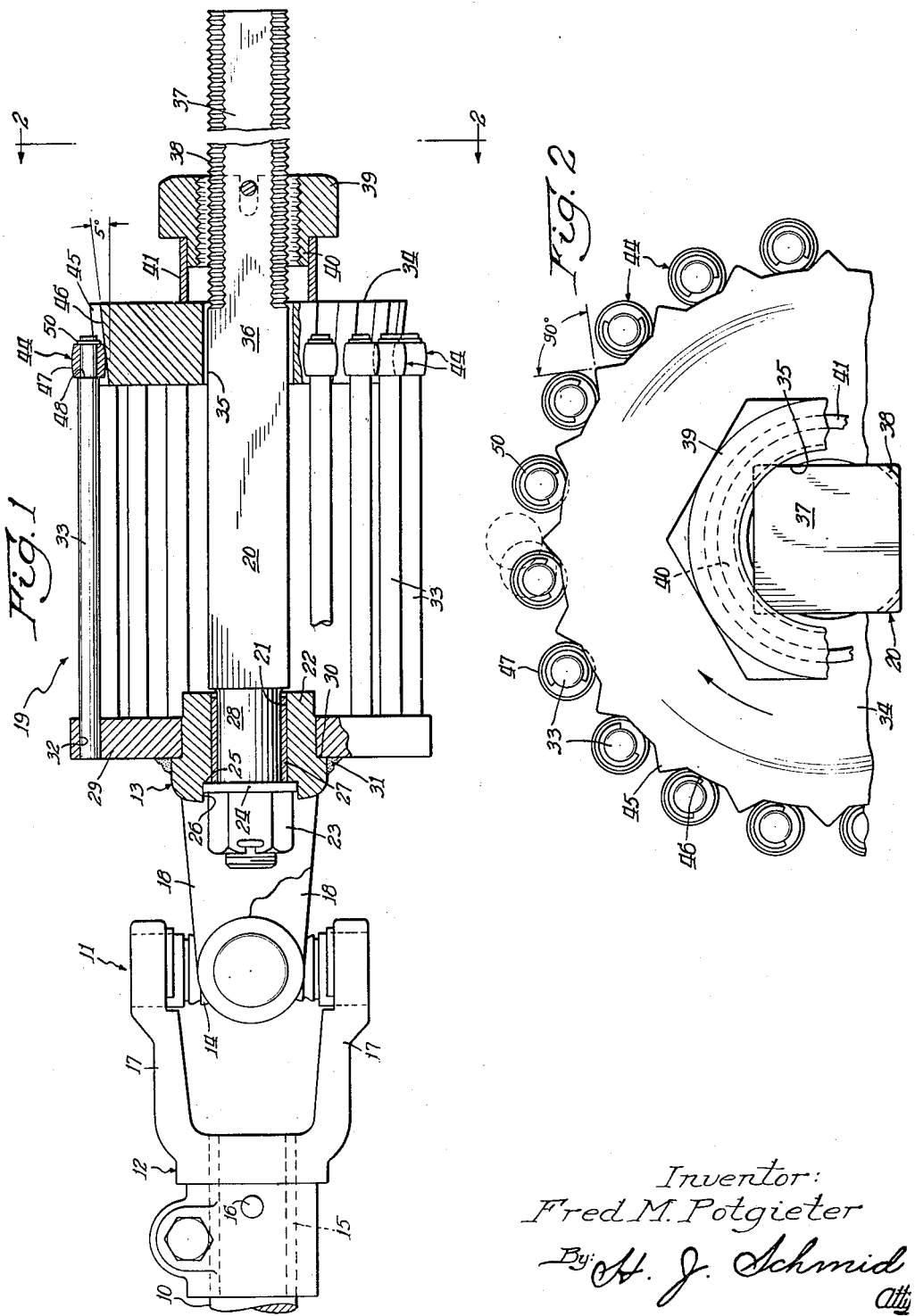
Inventor:
Fred M. Potgieter
By H. J. Schmid
Atty

United States Patent Office 2,706,388
Patented Apr. 19, 1955

2,706,388

SLIP CLUTCH ASSEMBLY

Fred M. Potgieter, Rockford, Ill., assignor to Borg-Warner Corporation, Chicago, Ill., a corporation of Illinois Application September 17, 1952, Serial No. 310,000

3 Claims. (Cl. 64—29)

This invention relates to couplings and more particularly to couplings of the torque responsive overload release or slip type providing a torque transmitting connection between driving and driven members and automatically controlling the application of torque to the driven member in such a manner as to slip and thereby discontinue the application of torque to the driven member when the applied torque exceeds a predetermined maximum.

Safety overload release couplings conventionally employed to connect driving and driven mechanisms, such as a tractor and farm implement, are usually of the type having jaw teeth springloaded against each other to slip and thereby disengage the mechanisms when the applied torque exceeds a predetermined value. In such couplings, adjustments may be made to vary the maximum torque to be delivered by the couplings, but the large variation in the coefficient of friction between the jaw teeth, due to rust and wear on the engaged surfaces of the teeth, makes it impossible to adjust the couplings to determine or set accurately the desired maximum torque value at which the couplings will slip.

An object of the present invention is to provide an improved torque-transmitting coupling for connecting a driving member to a driven member and incorporating means automatically releasing the driving member from the driven member when the torque, transmitted to the coupling, exceeds a predetermined value.

Another object of the invention is to provide an improved torque overload release coupling that can be adjusted to release at any predetermined maximum torque or load.

It is another object of the invention to provide an improved torque overload release coupling for transmitting torque independent of friction.

It is another object of the invention to provide an improved torque overload release coupling for connecting driving and driven members and embodying mechanism permitting end thrust of the driving and driven members without damaging or injurying the coupling.

It is a further object of the invention to provide an improved overload release coupling automatically disconnecting the driving and driven members, upon the application of a predetermined load or torque to the driven element, and to automatically reconnect the driving and driven members when the load or torque is reduced.

It is a further object of the invention to provide an improved overload release coupling for connecting driving and driven members and employing mechanism capable of absorbing sudden load or shock and preventing transfer thereof from one member to the other member.

The objects and advantages of the invention will become apparent from a consideration of the following detailed description taken in connection with the accompanying drawing wherein an embodiment of the invention is shown. However, it is to be understood that the invention is not limited to the details disclosed but includes all such variations and modifications as fall within the spirit of the invention and the scope of the claims.

In the drawing:

Fig. 1 is a side elevational view of my improved coupling, portions of some of the parts being broken away, and other portions being shown in central longitudinal cross section; and Fig. 2 is an end view of a portion of the coupling, looking in the direction of the arrows on line 2—2 of Fig. 1.

Referring to the drawing, there is shown a driving shaft 10 coupled to a transmission receiving power from an engine or other power driving means, and also connected to a universal joint generally indicated at 11, and comprising yokes 12 and 13, and a spider 14 connecting the yokes. The shaft 10 extends within a centrally located opening in the yoke 12 and has a splined connection as at 15 with the yoke 12. The shaft 10 and yoke 12 are secured against axial movement relative to each other by a pin 16 positioned within aligned transverse openings in the shaft and yoke. The arms 17, 17 of the yoke 12 are connected to the arms 18, 18 of the yoke 13 by the spider 14 to provide universal movement of the joint.

My improved overload release coupling is generally indicated at 19 and comprises a driven shaft 20 having one end extending through an axial opening 21 in the body 22 of the yoke 13 and in threaded engagement with a nut 23. A lock washer 24 is disposed between the nut 23 and a shoulder 25 on the shaft 20, the washer being received within an annular recess 26 in the body 22 of the yoke 13.

The yoke 13 is rotatably mounted on the shaft 20 by a bearing or bushing 27, within the opening 21 of the yoke 13, engaging the yoke 13 and a cylindrical portion 28 of the shaft. The yoke 13 extends within a centrally located opening in an annular disc or plate 29, the plate abutting a shoulder 30 on the yoke 13 and being secured to the yoke by a weld 31 for rotation therewith. The radially outermost portion of the disc 29 is provided with a plurality of equi-distantly circumferentially spaced openings 32 extending therethrough and receiving the adjacent ends of round, spring steel drive pins or rods 33 pressfitted into the openings 32 in the disc 29. The pins 33 extend parallel to the axis of the shaft 20, and extend between the disc 29 and an annular plate 34. The ends of the pins, adjacent the plate 34, surround and are arranged circumferentially of the plate 34.

The plate 34 is provided with a central square opening 35 through which a complementary shaped portion 36 of the shaft extends to provide a driving connection between the plate 34 and shaft 20. The end portion 37 of the shaft 20, projecting beyond the plate 34, is also square in cross section and the corners of the square end portion are provided with threads 38 in engagement with a nut 39. The nut 39 is provided with an annular flange 40 received within a tube or collar 41 having its opposite ends engaging the adjacent side of the plate 34 and the nut. The purpose of this arrangement will be later described.

The spring steel pins 33 are drivingly connected to the plate 34 and, for this purpose, are each provided with a roller 44 rotatably mounted on the end of the pin, disposed between cam teeth or projections 45 of the plate 34 and extending radially from the periphery of the plate, the rollers engaging the frusto-conical surface 46 of the plate.

Referring to Fig. 1, the plate 34 is of substantial thickness and the outer peripheral cam projections 45 and the frusto-conical surface 46 are inclined at an angle of 5° to the axis of the plate. The cam projections 45 equal the number of drive pins 33, twenty in the present design, and are spaced equi-distantly about the circumference of the plate approximately 18° apart and with the sides of each triangular shaped cam tooth being disposed at generally 90° from each other. Each roller 44 is ellipsoidal in longitudinal cross section as seen in Fig. 1 and has a spherical surface 47 engageable with the cylindrical surface 46 between two of the cam teeth 45 and engaging one of the adjacent sides of these teeth for driving the plate 34. The roller has a central bore receiving a reduced end of the associated pin 33 and is retained on the pin by one end of the roller abutting a shoulder 48 on the pin and the other end of the roller engaging a snap ring 50 positioned within a groove in the pin.

In the operation of my improved overload release clutch, torque is transmitted from the driving shaft 10 through the universal joint 11 and to the disc 29 and pins 33. Rotation of the pins urges the rollers 44 against the cam teeth 45 causing rotation of the plate 34 to transmit torque to the driven shaft 20 and to the load by means of the square hole in the plate 34, and the square portion 36 of the shaft 20. As the transmitted torque increases, the spring steel pins bend so that the rollers move out radially along the cam teeth until a predetermined maximum torque is applied, when the rollers will override the cam teeth (as shown in dotted lines in Fig. 2) and the coupling will slip and thereby discontinue the application of torque to the driven plate 34, and shaft 20. Upon the torque decreasing below the maximum predetermined torque, the pins will bend toward their original shape and the rollers will again engage the cam teeth to thereby again effect a driving connection between the pins and the driven plate 34.

It will be apparent that the amount of torque that the coupling can transmit is a function of the deflections of the pins 33, rather than of friction between engaging surfaces of parts, such as in conventional couplings utilizing spring-pressed jaw teeth. During transmission of torque under normal conditions, the steel spring pins have a cantilever beam action afforded by the radial and circumferential flexing deflection of the rods and there will be only slight rotation of the rollers along the sides of the cam teeth on the plate 34 in accordance with changes in torque or load, and independent of friction. Consequently, little wear of the rollers and cam teeth is had during operation of the coupling.

To adjust the coupling mechanism to vary the torque capacity of the coupling to any predetermined maximum torque or load value, the nut 39 may be rotated to move the collar 41 and thereby the cam plate 34 toward or away from the disc 29, the cam surfaces 46 of the plate 34 being effective to change the tension on the rods 33 as the plate 34 is moved laterally.

It will be noted that axial or end thrust of the driving and driven shafts 10 and 20 will not damage or injure the coupling mechanism as the thrust by either the shaft 10 or 20 will be transmitted to the other shaft by means of the universal joint, independent of the coupling mechanism.

The torque capacity of couplings embodying my invention, of course, is dependent upon the number of spring steel rods utilized, the diameter and length of the rods, and the type of steel and heat treatment of the same. The spring rods may be round and tapered in shape, if desired.

It will be understood that the invention described, is subject to such changes, modifications and departures from what is specifically illustrated and as may occur to those skilled in the art to which the invention appertains, without departing from the principle of the invention as defined in the appended claims.

I claim:

1. In a power transmitting automatically releasable coupling mechanism, driving and driven shafts; a pair of members respectively connected to said shafts for rotation about an axis and in axially spaced relation to each other, one of said members having a surface on its outer periphery converging toward the second member; a plurality of elongate resilient elements parallel to and radially spaced from said axis and extending between said members, each element being secured at one end thereof to said second member and having its other end extending over said surface of said one member and provided with rolling elements engaging said surface; cam teeth projecting from said surface of said one member and equi-distantly spaced about the periphery of the latter member and engaging said rolling elements and effective to drivingly connect said elements and said second member and to flex the resilient elements so that, upon the application of a predetermined maximum torque, the rolling elements rid over the cam means to effect cessation of torque transmission; and means engaging said one member for moving said one member axially to move said rolling elements axially along said surface to vary the said predetermined maximum torque.

2. In a power transmitting automatically releasable coupling mechanism, driving and driven shafts, a pair of annular driving and driven plates respectively connected to said shafts for rotation about an axis and in axially spaced relation to each other, the outer surface of said driven plate having cam teeth, and said surface including the teeth being conical and converging toward the driving plate, said driven shaft extending through said plates and rotatably mounting said driving plate and drivingly connected to the driven plate for connecting the driven plate to the load, said driven plate being movable axially of said driven shaft, said driven shaft having one end projecting beyond said driven plate to connect the mechanism to the load; a plurality of elongate resilient elements parallel to and radially spaced from said axis and extending between said plates, each element being secured at one end thereof to said driving plate and having its other end extending over said driven plate and provided with rolling elements, said cam teeth projecting from said surface of said driven plate and being equi-distantly spaced about the periphery of the latter plate and engaging said rolling elements to drivingly connect said elements and said driven plate and to flex the resilient elements so that, upon the application of a predetermined maximum torque, the rolling elements ride over the cam teeth to effect cessation of torque transmission; and means engaging said driven plate for moving said driven plate axially to move said rolling elements axially along said surface to vary the said predetermined torque capacity and including a nut in threaded engagement with said one end of said driven shaft and operative to effect relative axial movement of said plates.

3. In a power transmitting automatically releasing coupling mechanism, a driving shaft, a driven shaft, a first annular plate, means connecting said first plate to said driving shaft, a second annular plate having a frusto-conical form, means rotatably mounting said first plate on said driven shaft, means mounting said second plate on said driven shaft with the side of said second plate having the smallest diameter facing said first plate, said last-mentioned means comprising complementary engaging surfaces on said driven shaft and said second plate whereby rotation of said second plate effects rotation of said driven shaft while permitting axial movement of said second plate along said driven shaft, a plurality of elongate resilient members, means mounting one end of each of said members rigidly to said first plate with said ends of said resilient members in uniformly spaced relation adjacent the periphery of said first plate, a roller mounted to the opposite end of each of said resilient members, a plurality of uniformly spaced cam teeth disposed about the peripheral surface of said second plate, said plates and said resilient members being so constructed and arranged that said rollers engage the peripheral surface of said second plate intermediate the sides thereof, a threaded portion on said driven shaft projecting beyond the side of said second plate having the largest diameter, a nut disposed upon said threaded portion of said driven shaft, and a collar disposed between and engaging the side of said second plate having the largest diameter and said nut, rotation of said nut effecting axial movement of said collar and therefore said second plate to vary the tension of said resilient members.

References Cited in the file of this patent

UNITED STATES PATENTS

| | | |
|---|---|---|
| 2,441,038 | Siesel | May 4, 1948 |
| 2,558,158 | Rock | June 26, 1951 |

FOREIGN PATENTS

| | | |
|---|---|---|
| 846,203 | France | 1939 |